United States Patent
Rich

(10) Patent No.: US 10,350,971 B1
(45) Date of Patent: Jul. 16, 2019

(54) VEHICULAR-MOUNTED, RETRACTABLE CANOPY SYSTEM AND RELATED SYSTEMS AND METHODS

(71) Applicant: Sean Rich, Tucson, AZ (US)

(72) Inventor: Sean Rich, Tucson, AZ (US)

( * ) Notice: Subject to any disclaimer, the term of this patent is extended or adjusted under 35 U.S.C. 154(b) by 0 days.

(21) Appl. No.: 16/031,890

(22) Filed: Jul. 10, 2018

Related U.S. Application Data

(60) Provisional application No. 62/530,424, filed on Jul. 10, 2017.

(51) Int. Cl.
| | | |
|---|---|---|
| *B60J 1/20* | (2006.01) | |
| *A45B 11/00* | (2006.01) | |
| *B60J 3/00* | (2006.01) | |
| *A45B 23/00* | (2006.01) | |

(52) U.S. Cl.
CPC ............ *B60J 3/002* (2013.01); *A45B 11/00* (2013.01); *A45B 2023/0025* (2013.01)

(58) Field of Classification Search
CPC .. B60J 3/002; A45B 11/00; A45B 2023/0025; E04H 15/06; B60R 7/12
See application file for complete search history.

(56) References Cited

U.S. PATENT DOCUMENTS

| | | | | |
|---|---|---|---|---|
| 4,887,786 A * | 12/1989 | Stokes | ............ | A45B 11/00 248/512 |
| 5,529,368 A * | 6/1996 | Cui | ............ | A45B 11/00 135/16 |
| 5,609,321 A * | 3/1997 | McClellan | ............ | A45B 11/00 248/215 |
| 6,105,594 A * | 8/2000 | Diaz | ............ | A45B 11/00 135/16 |
| 6,213,137 B1 * | 4/2001 | Wang | ............ | B60R 7/12 135/16 |
| 8,485,207 B1 * | 7/2013 | Boyington | ............ | E04H 15/06 135/16 |
| 2006/0254635 A1 * | 11/2006 | Matheus | ............ | E04H 6/04 135/88.05 |
| 2006/0289044 A1 * | 12/2006 | Benett | ............ | A45B 11/00 135/16 |
| 2010/0059093 A1 * | 3/2010 | Clark | ............ | A45B 11/00 135/16 |
| 2012/0234885 A1 * | 9/2012 | Hall | ............ | B60R 11/00 224/567 |
| 2018/0208030 A1 * | 7/2018 | Teague | ............ | B60J 5/0494 |

* cited by examiner

*Primary Examiner* — Noah Chandler Hawk
(74) *Attorney, Agent, or Firm* — Hayes Soloway P.C.

(57) ABSTRACT

A vehicular-mounted retractable canopy system and related systems and methods are provided. The system includes a vehicle and a first member mounted to the vehicle. A second member is retractably movable from the first member, wherein a first end of the second member is extendable beyond a footprint of the vehicle. A deployable canopy is mounted to the second member at substantially the first end of the second member.

18 Claims, 6 Drawing Sheets

VEHICULAR-MOUNTED, RETRACTABLE CANOPY SYSTEM AND RELATED SYSTEMS AND METHODS

CROSS REFERENCE TO RELATED APPLICATION

This application claims benefit of U.S. Provisional Application Ser. No. 62/530,424 filed Jul. 10, 2017 and titled "Vehicular-Mounted, Retractable Canopy Apparatus and Related Systems and Methods," the entire disclosure of which is incorporated herein by reference.

FIELD OF THE DISCLOSURE

The present disclosure is generally related to shade devices and more particularly is related to a vehicular-mounted, retractable canopy system and related systems and methods.

BACKGROUND OF THE DISCLOSURE

Recreational vehicles, such as Off-Road vehicles, All-Terrain Vehicles (ATVs), and Utility Task Vehicles (UTVs), are primarily used in outdoor settings with sun exposure. These settings commonly include trails, tracks, parks, or wilderness settings, among others. While the vehicles are often equipped with a roof which provides some shade from the sun, the roof is primarily designed for protecting the driver and passenger of the vehicle from rain and other precipitation, and thus, is usually only large enough to shade the users when the sun is directly overhead. When the sun is not positioned directly overhead but is angular to the vehicle, the roof of the vehicle does little to provide shade to the users.

While users of these vehicles have learned to tolerate sun exposure while operating the vehicles, they are often left no choice but to sit in the direct sunlight during breaks and downtime, since these breaks and periods of downtime often take place along the trail where no other shelter is available. This situation leads to users being susceptible to the medical hazards of sitting in direct sunlight, including sunburns, dehydration, and heatstroke. In certain environments, namely in hot, arid, desert settings, medical issues from sun exposure can occur very rapidly. For example, in the arid deserts of the American Southwest and Mexico, UTVs are often used for driving on sandy dunes and trails where it is common for temperatures to exceed 100° F. and the intense sun to reach a UV index level at or exceeding 11. In these conditions, sunburns can occur with as little as 10 minutes of exposure time. Accordingly, when users of the vehicles take even brief mid-route breaks from driving, they're left no choice but to sit in the vehicle and endure the sun exposure.

Thus, a heretofore unaddressed need exists in the industry to address the aforementioned deficiencies and inadequacies.

SUMMARY OF THE DISCLOSURE

Embodiments of the present disclosure provide a vehicular-mounted retractable canopy system and related systems and methods. Briefly described, in architecture, one embodiment of the system, among others, can be implemented as follows. A first member is mounted to a vehicle. A second member is retractably movable from the first member, wherein a first end of the second member is extendable beyond a footprint of the vehicle. A deployable canopy is mounted to the second member at substantially the first end of the second member.

The present disclosure can also be viewed as providing methods of using a deployable canopy from a vehicle. In this regard, one embodiment of such a method, among others, can be broadly summarized by the following steps: mounting a first member to the vehicle; mounting a second member within the first member, wherein the second member is retractably movable from within the first member; extending a first end of the second member out from within the first member to a point beyond a footprint of the vehicle; and deploying a canopy mounted to the second member at a location substantially at the first end of the second member.

The present disclosure can also be viewed as providing a system for a vehicular-mounted rider shade. Briefly described, in architecture, one embodiment of the system, among others, can be implemented as follows. A vehicular-mounted rider shade system includes a vehicle, a first member mounted to the vehicle, and a second member retractably movable from the first member. A first end of the second member is extendable beyond a footprint of the vehicle. The first end includes an L-shaped arm, and an end of the L-shaped arm is oriented substantially vertical. A pivotal joint is connected to the end of the L-shaped rotational arm. A keyway system is interfaced between the first and second members. The keyway system includes an elongated slot extending along at least a portion of the second member and a protrusion positioned through a sidewall of the first member and into the elongated slot. The protrusion prohibits rotational movement of the second member within the first member. A deployable canopy includes a shaft and a shade. The shaft is mounted to the second member at the substantially vertical end of the L-shaped rotational arm with the pivotal joint. The pivotal joint allows rotation of the canopy between deployed and non-deployed positions.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
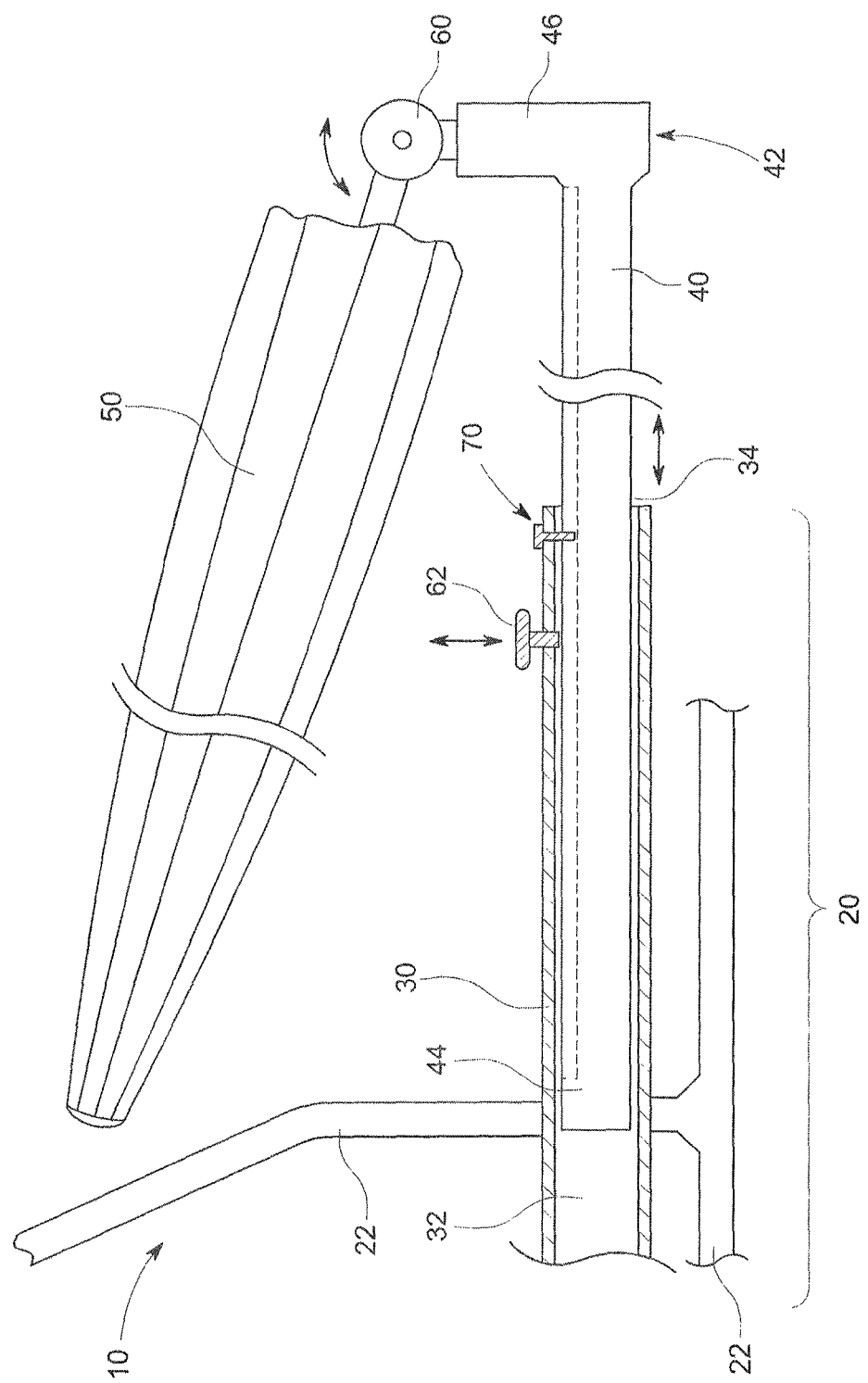
FIG. 1 is a cross-sectional illustration of a vehicular-mounted retractable canopy system, in accordance with a first exemplary embodiment of the present disclosure.
Figure 2:
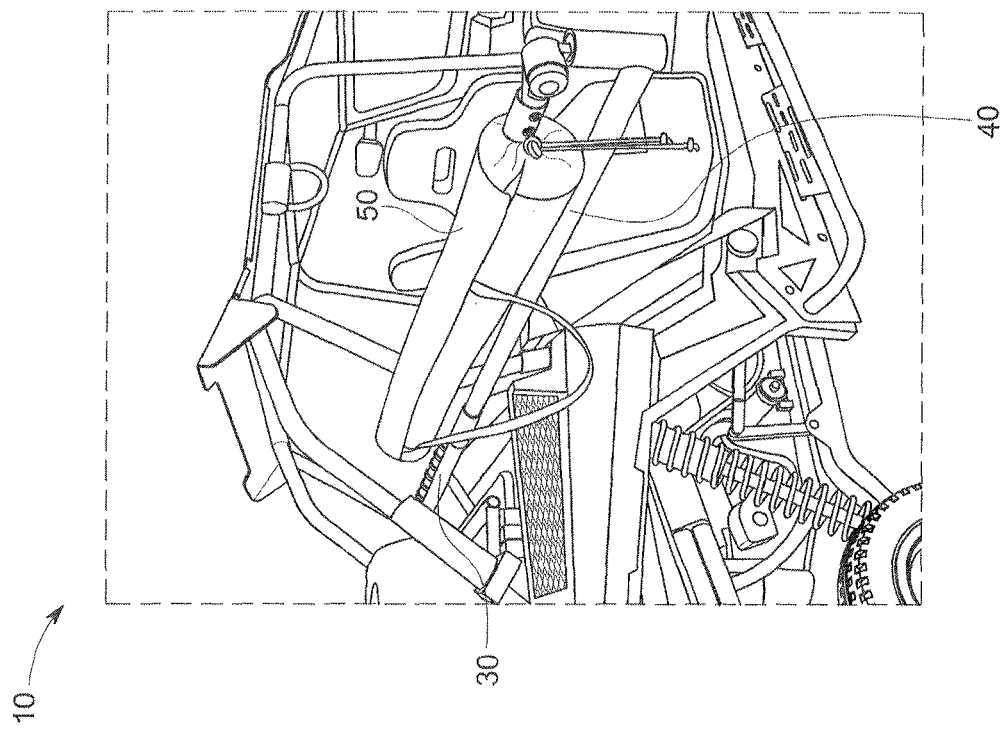
FIGS. 2-5 are photographs of the system of FIG. 1 in various positions, in accordance with the first exemplary embodiment of the present disclosure.
Figure 3:
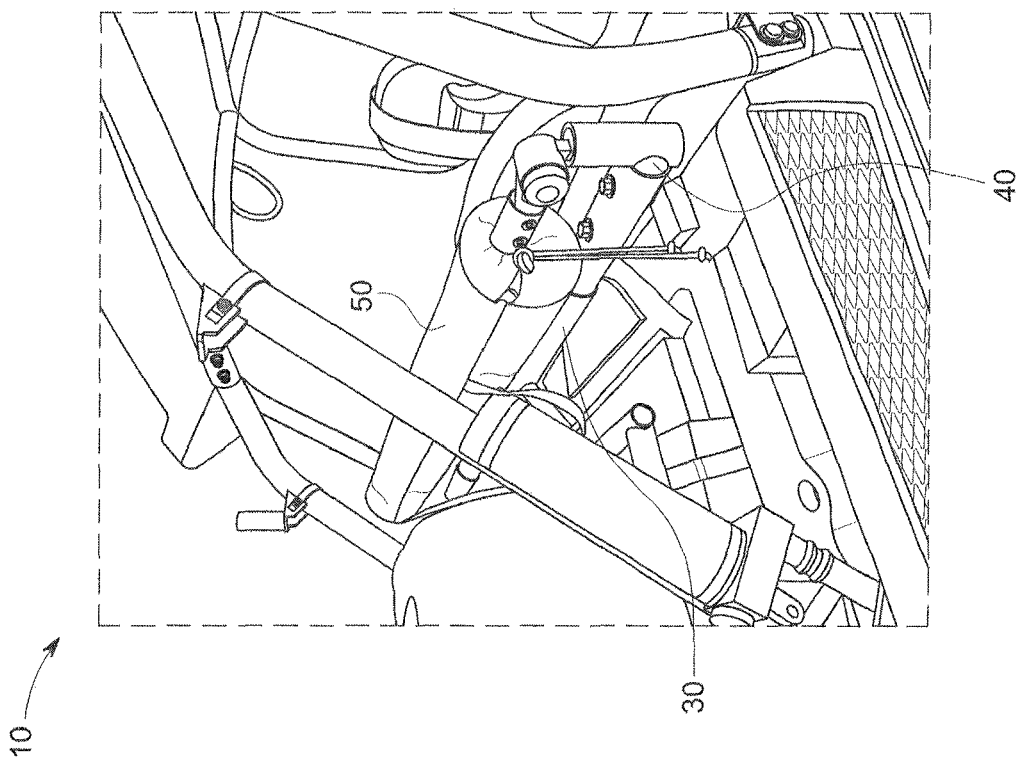
Figure 4:
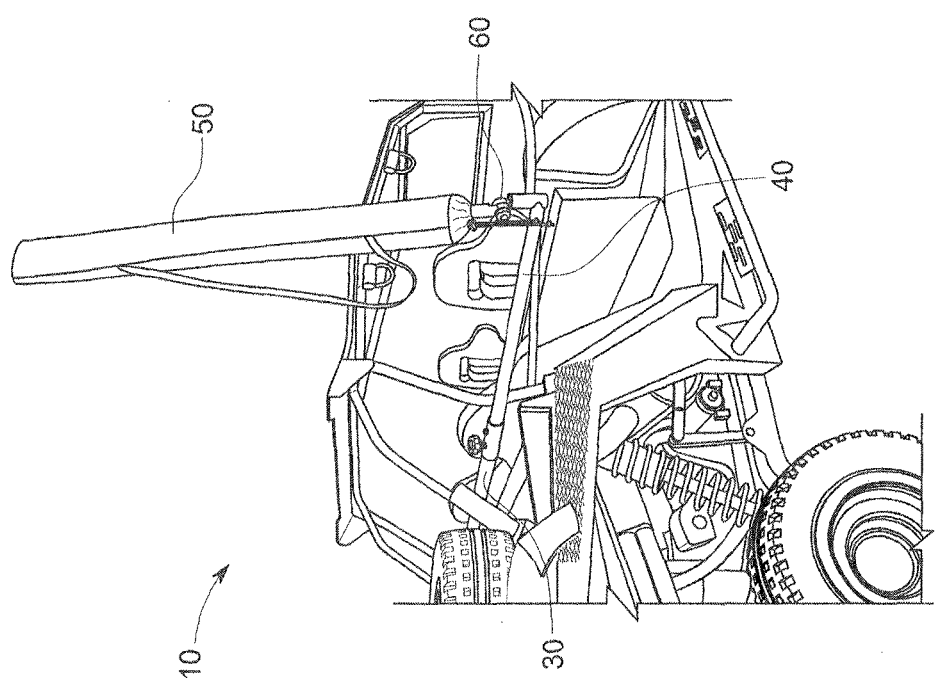

FIG. 1 is a cross-sectional illustration of a vehicular-mounted retractable canopy system 10, in accordance with a first exemplary embodiment of the present disclosure. FIGS. 2-4 are photographs of the system 10 of FIG. 1 in various positions, in accordance with the first exemplary embodiment of the present disclosure. With reference to FIGS. 1-5, the vehicular-mounted retractable canopy system 10, which may be referred to simply as 'system 10' includes a vehicle 20. In FIG. 1, the portion of the vehicle 20 depicted is part of the roll cage structure 22 which is mounted to a frame of the vehicle 20, as is known in the art. A first member 30 is mounted to the vehicle 20 through the roll cage structure 22. A second member 40 is retractably movable from the first member 30, wherein a first end 42 of the second member 40 is extendable beyond a footprint of the vehicle 20. A deployable canopy 50 is mounted to the second member 40 at substantially the first end 42 thereof.

The system 10 may be used with vehicles to provide shading from the sun for the users of the vehicles. Commonly, the system 10 may be used with off-highway vehicles, such as off-road vehicles, UTVs, ATVs, or other recreational vehicles. The system 10 may also be used with other types of vehicles 20, such as boats and watercraft, RVs, or campers. As will be described herein in further detail, the system 10 may provide benefits to the users of the vehicles, including the driver and passengers, by allowing for the canopy 50 of the system 10 to be stowed in a convenient location when sun shading is not needed, such that the system 10 does not interfere with normal operation and use of the vehicle 20. Then, when sun shading is needed, such as during breaks or periods of downtime of the vehicle, and especially when shelters from the sun are not otherwise available to the users of the vehicle 20, the deployable canopy 50 can be deployed from the vehicle 20.

The system 10 may be particularly beneficial when used with UTVs in remote places in arid climates, where shade from the sun is especially important but not readily accessible. While the system 10 is described herein relative to use with a UTV, use with other vehicles is within the scope of the present disclosure. As shown in FIG. 1, the first member 30 may be mounted to the roll cage 22 of the vehicle 20 or to another structure on the vehicle, such as the frame or a body panel thereof. The attachment of the first member 30 to the vehicle 20 may be achieved by any known devices or techniques, including welding, threaded fasteners, friction fasteners, zip-ties, or removable fasteners. It may be preferable for the first member 30 to be connected to the vehicle 20 through at least two attachment points on the vehicle 20 to ensure proper stability of the system 10. In one example, the first member 30 may be mounted laterally across the vehicle 20, which may generally be along the direction from a left side of the vehicle 20 to a right side of the vehicle 20, or from the driver's seat to the passenger's seat. Lateral mounting may allow the deployable canopy 50 to be positioned near enough to a rider, driver, or other user to provide shade from the sun. In another example, the first member 30 may be mounted longitudinally along the vehicle 20, i.e., along the direction from the front of the vehicle 20 to the back. This may depend on the shape and orientation of the vehicle 20. In either lateral or longitudinal positions, the first member 30 may have a substantially horizontal orientation to a ground surface on which the vehicle 20 is positioned.

The first member 30 may generally include an elongated, rigid member, such as a cylinder, bar, or pipe of metal construction, which has a substantially hollow interior 32. The first member 30 may be attached to the vehicle 20 without obstructing the hollow interior 32. At least one end 34 of the first member 30 may be open to allow access to the hollow interior 32, in particular, to allow for positioning the second member 40 at least partially within the hollow interior 32 of the first member 30. In this configuration, the second member 40 may be retractable from the first member 30, whereby at least a portion of the second member 40 is telescopable from the hollow interior 32 of the first member 30. Accordingly, this design allows the first end 42 of the second member 40 to be moveable from a position proximate to the end 34 of the first member (when the second member 40 is in a retracted position, as shown in FIG. 2) to a position where the first end 42 of the second member 40 is extended from the end 34 of the first member 30 (when the second member 40 is in an extended position, as is shown in FIG. 3). When the second member 40 is in the retracted position, it may generally be in a stowed position on the vehicle 20, whereas the second member 40 in the extended position may generally be understood as the deployed position of the second member 40.

When in the extended position, the first end 42 of the second member 40 may be positioned outside the general footprint of the vehicle 20, such that the first end 42 is substantially positioned to the side of the vehicle 20. This position can be seen in at least FIGS. 3-5 where the first end 42 is positioned laterally to the side of the vehicle 20. The other end, i.e., second end 44 of the second member 40 may remain within the first member 30, thereby maintaining physical contact between the members 30, 40, and to allow the second member 40 to remain supported by the first member 30. The deployable canopy 50 may be mounted to the first end 42 of the second member 40, which allows it to be deployed or opened from a supported position on the first end 42, such that the position of the deployable canopy 50 can be determined, at least in part, by the location of the first end 42. It is noted that the deployable canopy 50 may include many different types of sunshades, including an umbrella or other covering which is capable of being deployed to create a covering. In the extended position, the second member 40 may be extended outside the footprint of the vehicle far enough to allow the canopy 50 to be pivoted or rotated to a substantially vertical position without a top portion of the canopy 50 contacting a roof, roll-bars, or other structures of the vehicle.

It is noted that the canopy 50 may include various structures. In one example, the canopy 50 may include a shade having solar panels on a side of the shade facing the sun. The solar panels may be used to power and recharge electronic devices such as GPS, phones, air circulators, and the like. In another example, the canopy 50 may include components such as a shaft and a shade, similar to an umbrella. The shaft may enable the canopy 50 to be mounted to the second member 40 or the rotational arm member 46. The shade may be the part of the canopy 50 that blocks the sun.

The deployable canopy 50 may further be mounted to the first end 42 of the second member 40 through use of an articulated joint 60, such as an elbow joint, which allows the deployable canopy 50 to be moved angularly or otherwise about the first end 42. The articulated joint 60 may allow movement of 180° of the deployable canopy 50 relative to the second member 40. Thus, as can be understood from FIG. 1, the deployable canopy 50 can be positioned substantially parallel with the first and second members 30, 40 when not in use, such as shown in FIGS. 2-3, and then moved to a substantially perpendicular position to the first and second members 30, 40 when the second member 40 is extended, such as shown in FIG. 4 The first end 42 may also include an extension or arm member 46 which is connected to the terminating end of the second member 40, which may be used to allow for rotational movement of the articulated joint 60 relative to the first end 42 of the second member 40. The articulated joint 60 may axially rotate or pivot within the rotational arm member 46 when the canopy 50 is deployed. The resulting available positions that can be achieved with the deployable canopy 50 are numerous, as its translational position, angular position, and rotational position can be adjusted or determined by the user, which effectively allows it to be positioned in any desired position to shade the sun.

When the deployable canopy 50 has been positioned in the desired position by the user, it may be retained in that position with various fasteners. For example, the articulated joint 60 may be locked into a particular position with a threaded fastener, or in some cases, the articulated joint 60 may be movable with sufficient force but static enough to withstand inadvertent movements. The second member 40 may be locked in place relative to the first member 30 through use of a locking threaded fastener 62 which may be positioned through a sidewall of the first member 30. The locking threaded fastener 62 may include a thumb screw or threaded knob which can be rotated to make contact with the exterior surface of the second member 40, thereby frictionally holding the second member 40 in place. Rotational movement and unwanted translational movement of the second member 40 relative to the first member 30 may also be prevented with a keyway system 70 using a threaded fastener, as is discussed in detail relative to FIGS. 6-7.

Figure 5:
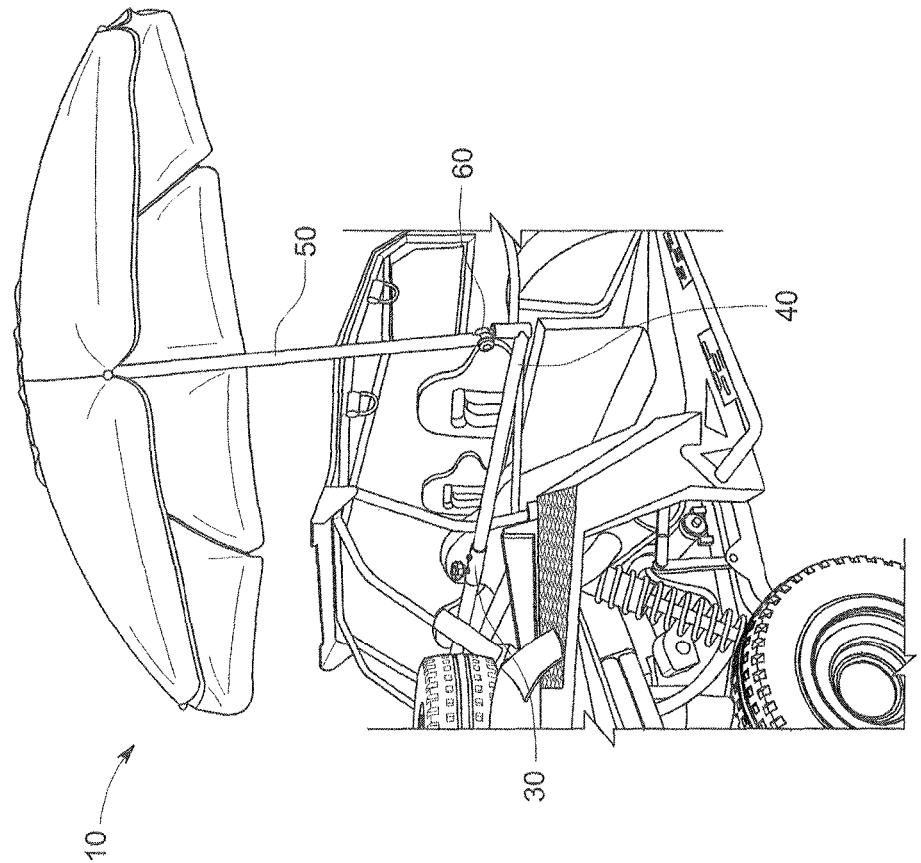

FIG. 5 depicts the system 10 with the deployable canopy 50 in the fully deployed state, where the deployed canopy 50 is opened to provide shade from the sun and the second member 40 is extended from the first member 30. When the system 10 is in this position, even with the vehicle 20 stationary, the weight of the components of the system 10 and the wind forces on the deployable canopy 50 may place stress and strain on the components. Accordingly, it is desirable for the system 10 to be formed from durable components that allow it to withstand use in all conditions. The materials of construction may include those which are strong, durable, lightweight and not susceptible to rust. In one example, the first and second members 30, 40 may be formed from steel and aluminum tubing, respectively, while the articulated joint 60 and deployable canopy 50 can include aluminum structural components.

The advantages of the present disclosure can be seen relative to FIGS. 1-5 in that the present disclosure provides a canopy system that can be mounted to a vehicle, stored within the footprint of the vehicle while not in use, deployed outside the footprint of the vehicle while in use, and manipulated to provide shade at numerous angles and positions. It is important that the system 10 be stored within the footprint of the vehicle 20 in order to maintain the vehicle's relative size, weight distribution, and ability. For example, off-road vehicles that crawl over rocky terrain and in tight spaces may do so because the vehicles are balanced and sized appropriately. An exterior canopy structure may change this design, limiting the vehicle's use. Alternatively, an exterior structure may subject the canopy to excessive wear and tear. It is also important that the canopy 50 be deployable outside the general footprint of the vehicle 20. As discussed above, the vehicle 20's roof may provide only limited shade to riders. An extendable canopy 50 provides additional shade area, especially when the sun is not directly overhead. Additionally, it is important that the position of the canopy 50 can be manipulated, as this allows users to accurately place the canopy 50 between the user and the sun without regard for orientation of the vehicle. Likewise, the canopy 50 may be adjusted as the sun moves across the sky.

Figure 6:
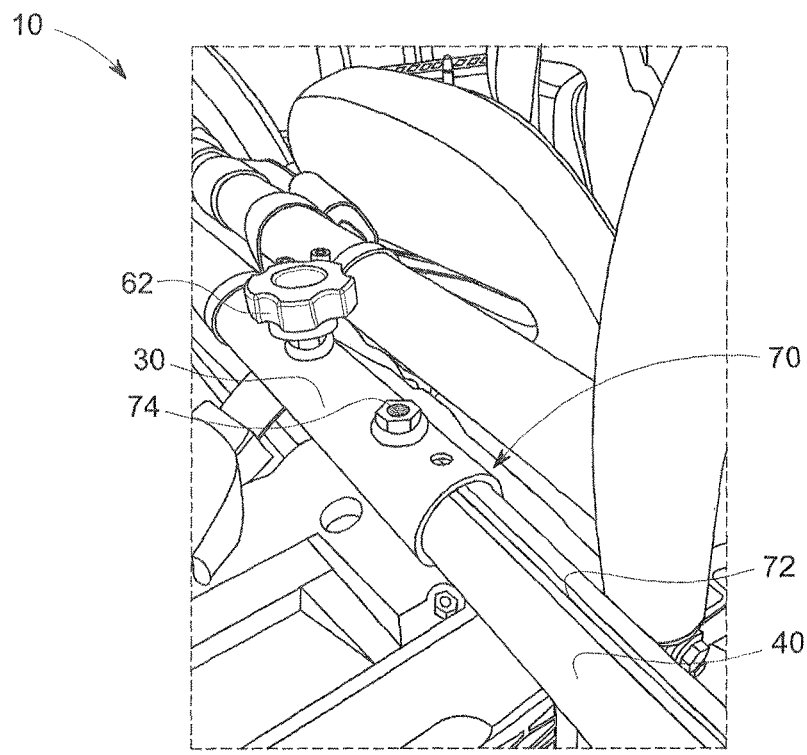
FIG. 6 is a photograph of the junction of the first and second member of the system of FIG. 1, in accordance with the first exemplary embodiment of the present disclosure.
Figure 7:
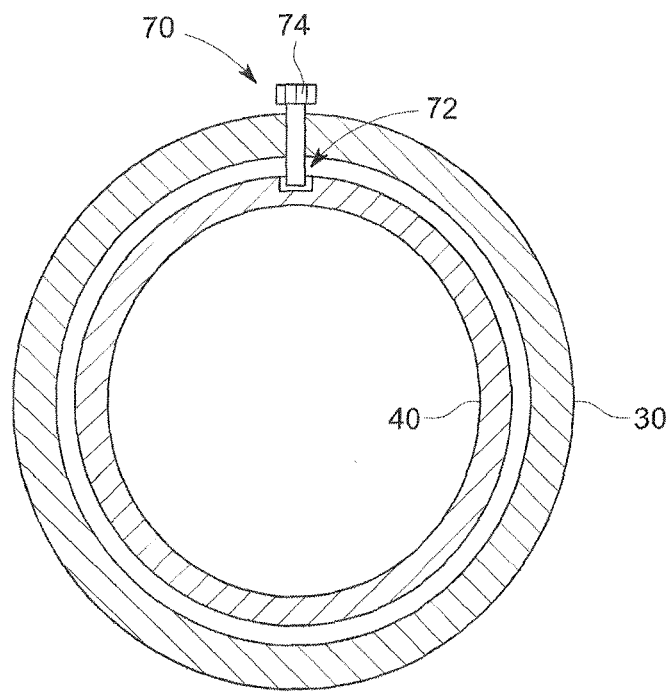
FIG. 7 is a cross-sectional diagram of the keyway system, in accordance with the first exemplary embodiment of the present disclosure.

FIG. 6 is a photograph of the junction of the first and second member 30, 40 of the system 10 of FIG. 1, in accordance with the first exemplary embodiment of the present disclosure. FIG. 7 is a cross-sectional diagram of the keyway system 70, in accordance with the first exemplary embodiment of the present disclosure. With reference to FIGS. 6-7, the keyway system 70 may be integrated between the first and second members 30, 40 to prevent rotational movement of the second member 40 relative to the first member 30 and to prevent the second member 40 from being fully removed from the first member 30, e.g., where the two members 30, 40 become disconnected. The keyway system 70 may include a keyway 72 cut into the outer surface of the second member 40 which runs along a substantial length of the second member 40. A protrusion or threaded fastener 74 may be positioned through a sidewall of the first member 30 such that it protrudes past the inner diameter surface of the first member 30 and into the keyway 72 in the second member 40. In this position, the threaded fastener 74 may prevent the second member 40 from rotating within the first member 30, which may act to prevent the deployable canopy 50 from tipping sideways when deployed. This may allow the keyway system 70 to maintain the orientation of the second member 40 within the first member 30.

The length of the keyway 72 within the second member 40 may be chosen based on the desired extension length of the second member 40 from the first member 30. As is shown in FIG. 1 in broken lines, the keyway system 70 may include a cutout (keyway 72 in FIGS. 6-7) which ends prior to the second end 44 of the second member 40. When the second member 40 is pulled out from the first member 30, when the threaded fastener 74 contacts the terminating end of the keyway 72 at the second end 44 of the second member 40, any further movement of the second member 40 is prevented. Accordingly, the keyway system 70 may prevent the second member 40 from being inadvertently entirely pulled out of the first member 30. It is noted that the threaded fastener 74 may be removable, such that the second member 40 can be entirely removed from the first member 30 when the user desires, such as to maintenance the system 10. It is further noted that the contact between the threaded fastener 74 and the keyway 72 may be a low friction, movable contact, such that the second member 40 can be slid out from the first member 30 with ease. When the second member 40 is in the desired position, the user may then actuate the locking threaded fastener 62 to frictionally retain the second member 40 in a stationary position relative to the first member 30.

Figure 8:
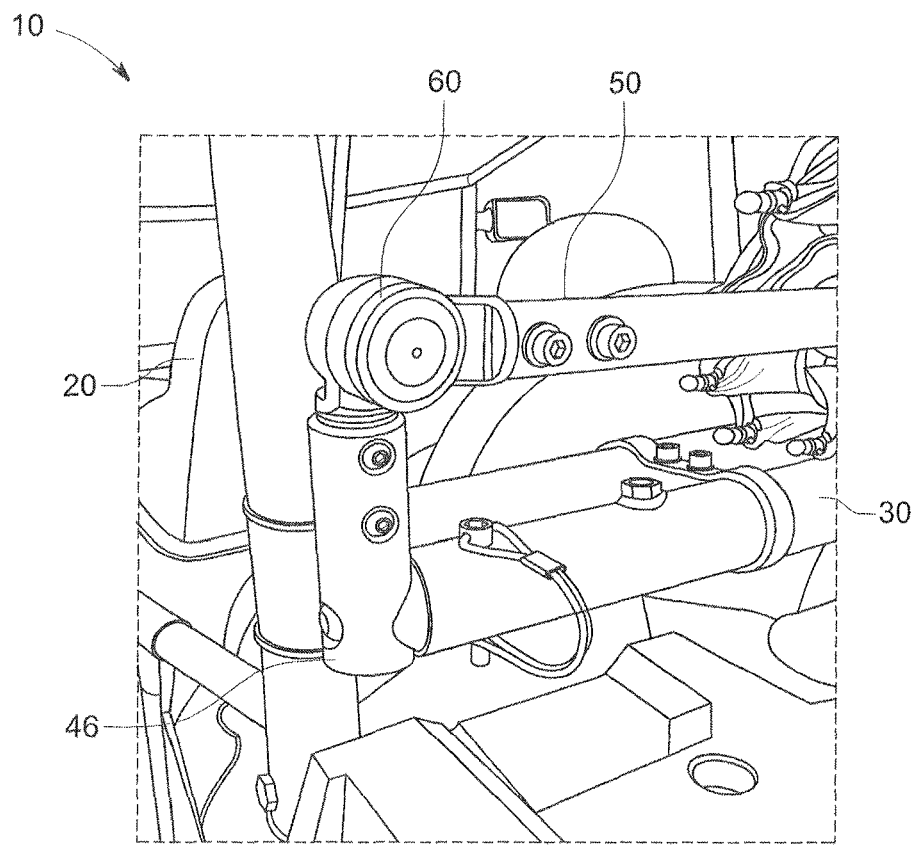
FIG. 8 shows the extension arm member and articulated joint of the system of FIG. 1, in accordance with the first exemplary embodiment of the present disclosure.

FIG. 8 shows the rotational arm member 46 and articulated joint 60 of the system 10 of FIG. 1, in accordance with the first exemplary embodiment of the present disclosure. FIG. 8 shows the system 10 in a stored or non-deployed state. The first arm 30 of the system 10 may be mounted to the vehicle 20, as described relative to FIG. 1, above. The second arm 40 may be stored within the first arm 30. The rotational arm member 46 attached to the second arm 40 may be an L-shaped member. The L-shaped member may be a unitary piece having two arms oriented substantially perpendicular to one another. In one example, one arm may be longer than the other. For instance, a long arm of the L-shaped member may be located along or a part of the second member 40, while the other arm is oriented perpendicular to the second member. In one example, one end of the rotational arm member 46 may be oriented substantially vertical. The vertical end of the rotational arm member 46 may hold a portion of the canopy 50 having the articulated joint 60. The articulated joint 60 may rotate similar to a knee, rotating the canopy 50 from a horizontal position to a substantially vertical position in use, as shown relative to FIGS. 4-5, above. Put another way, the articulated joint 60 may allow the canopy 50 to move between an initial position substantially parallel with the first and second members 30, 40 to a position substantially perpendicular with the first and second members 30, 40. In another example, the articulated joint 60 may allow the canopy to be placed at several orientations less than or greater than perpendicular to the first and second members 30, 40. The canopy 50 may rotate axially within the rotational arm member 46. The combination of the rotational arm member 46 and the articulated joint 60 may allow the canopy 50 to be placed at a number of angles relative to the position of the sun in the sky and riders in the vehicle 20. This, along with the ability to extend the system 10 beyond the footprint of the vehicle, may allow riders in the vehicle 20 to obtain shade regardless of the vehicle 20's orientation to the sun.

In one example, the rotational joint 60 may be a pivotal joint that allows rotation of the canopy 50 between deployed and non-deployed positions by pivoting the canopy 50 at the joint.

Figure 9:
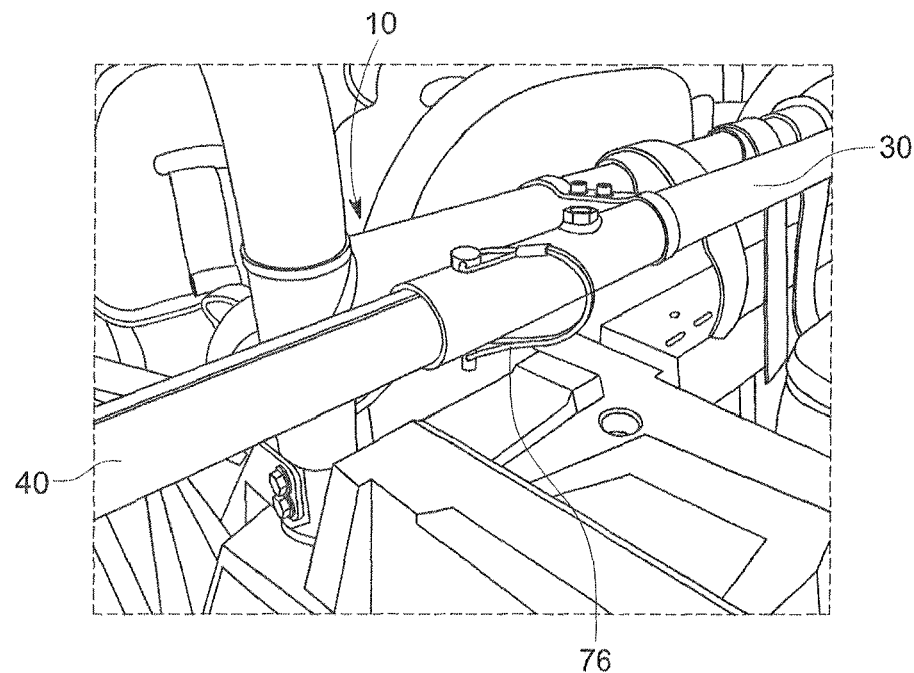
FIG. 9 shows an exemplary locking pin of the system of FIG. 1, in accordance with the first exemplary embodiment of the present disclosure.

FIG. 9 shows an exemplary locking pin 76 of the system 10 of FIG. 1, in accordance with the first exemplary embodiment of the present disclosure. The second member 40 may be extended out from within the first member 30 until it has reached a satisfactory distance beyond the footprint of the vehicle. Once the second member 40 has been extended, the user may lock the first and second members 30, 40 by inserting a locking pin 76 through holes in the first and second members 30, 40. The holes may be aligned at one or more points along the second member 40, such that the second member 40 can be locked at one or more extension lengths. The locking pin 76 may be any suitable pin for maintaining the relative positions of the first and second members 30, 40. In one example, the locking pin 76 may be a round wire locking pin, and may include a wire that maintains the position of the pin within the first and second members 30, 40.

Figure 10:
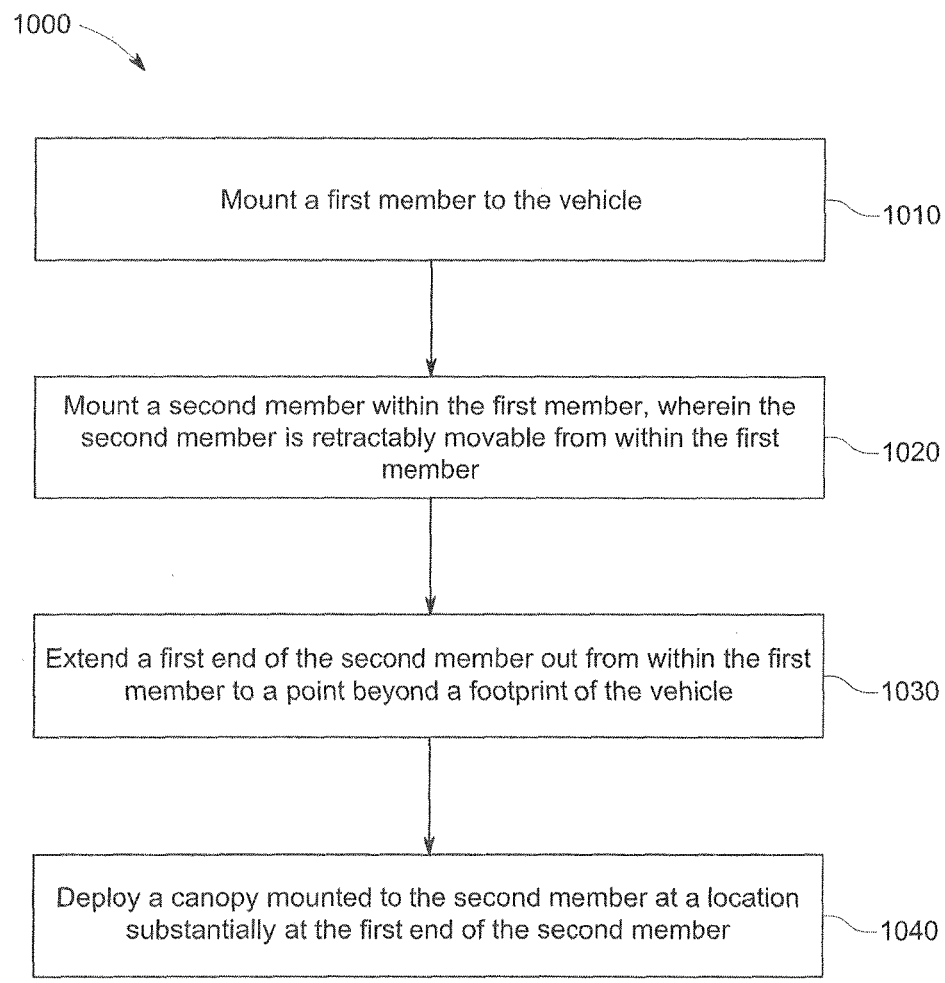
FIG. 10 is a flow chart showing a method of using a deployable canopy from a vehicle, in accordance with the first exemplary embodiment of the present disclosure.

FIG. 10 is a flow chart 1000 showing a method of using a deployable canopy from a vehicle, in accordance with the first exemplary embodiment of the present disclosure. Step 1010 includes mounting a first member to the vehicle. In one example, the first member may be mounted so as to prevent movement, rotation, or excessive force to any mounting points. This may include mounting the first member at more than one different point on the vehicle to securely fasten it. As discussed above relative to FIG. 1, in one example, the first member may be mounted to a secure structural element of the vehicle, such as a roll cage. Step 1020 includes mounting a second member within the first member, wherein the second member is retractably movable from within the first member. The second member may be slidable from within the first member, such as with a telescoping arm that can extend and retract using a series of graduated members nested within each other. Step 1030 includes extending a first end of the second member out from within the first member to a point beyond a footprint of the vehicle. A portion of the second member may be extended out from the first member to reach this point, depending on the size of the vehicle, the length and location of the first member, and the length of the second member. In one example, the second member may be substantially completely extended from the first member. There may only be a small portion of the second member remaining within the first member. This may be enough to allow the second member to remain statically fixed within the first member, i.e., to not fall out of the first member. Step 1040 includes deploying a canopy mounted to the second member at a location substantially at the first end of the second member. The canopy may be mounted directly to the second member, or it may be mounted within a rotational arm member, such as an L-shaped arm. The rotational arm member may allow the canopy to rotate axially relative to a shaft of the canopy, which may allow the position of the canopy relative to the sun to be changed by a user as necessary.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A vehicular-mounted retractable canopy system comprising:
    a vehicle;
    a first member mounted to the vehicle;
    a second member retractably movable from the first member, wherein a first end of the second member is extendable beyond a footprint of the vehicle, wherein the second member further comprises a keyway system to maintain an orientation of the second member relative to the first member, the keyway system comprising:
    an elongated slot extending along at least a portion of the second member; and
    a protrusion positioned through a sidewall of the first member and into the elongated slot, wherein the protrusion prohibits rotational movement of the second member within the first member; and
    a deployable canopy mounted to the second member at substantially the first end of the second member.

2. The system of claim 1, wherein the first member is mounted laterally across the vehicle.

3. The system of claim 1, wherein the deployable canopy is stored substantially parallel with the first and second members when in a non-deployed position.

4. The system of claim 3, wherein the deployable canopy is deployable from an initial position substantially parallel with the first and second members to a second position substantially perpendicular with the first and second members.

5. The system of claim 1, wherein the deployable canopy is mounted to a rotational arm member connected to the first end of the second member, and wherein the deployable canopy is rotatable within the rotational arm member when in a deployed position.

6. The system of claim 5, wherein the rotational arm member is an L-shaped member comprising a first arm and a second arm oriented substantially perpendicular to one another, wherein the first arm is attached to the second member, and wherein the second arm is oriented substantially vertical.

7. The system of claim 1, wherein the deployable canopy further comprises an articulated joint between a top of the deployable canopy and the first end of the second member, and wherein the deployable canopy is rotatable about the articulated joint.

8. The system of claim 1, wherein the first member is mounted to the vehicle through at least two attachment points on the vehicle.

9. A method of using a deployable canopy from a vehicle, comprising the steps of:
mounting a first member to the vehicle;
mounting a second member within the first member, wherein the second member is retractably movable from within the first member;
extending a first end of the second member out from within the first member to a point beyond a footprint of the vehicle, wherein the step of extending the first end of the second member further comprises sliding an elongated slot extending along at least a portion of the second member through a protrusion positioned through a sidewall of the first member and into the elongated slot; and
deploying a canopy mounted to the second member at a location substantially at the first end of the second member.

10. The method of claim 9, wherein the first member is mounted laterally across the vehicle.

11. The method of claim 9, wherein the canopy is stored substantially parallel with the first and second members when not deployed.

12. The method of claim 9, wherein the step of deploying the canopy further comprises rotating the canopy within a rotational arm member connected to the first end of the second member.

13. The method of claim 9, wherein the step of deploying the canopy further comprises rotating the canopy about an articulated joint between a top of the canopy and the first end of the second member.

14. The method of claim 13, wherein rotating the canopy about the articulated joint comprises placing the canopy between a rider of the vehicle and sunlight in order to provide shade to the rider.

15. The method of claim 14, further comprising the step of adjusting a position of the canopy over time to track a direction of the sunlight.

16. The method of claim 9, wherein the canopy is deployed after the step further comprising the step of returning the first member, second member, and canopy to initial positions thereof.

17. The method of claim 9, wherein the step of mounting the first member to the vehicle comprises mounting through at least two different attachment points on the vehicle.

18. A vehicular-mounted rider shade system comprising:
a vehicle;
a first member mounted to the vehicle;
a second member retractably movable from the first member, wherein a first end of the second member is extendable beyond a footprint of the vehicle, wherein the first end comprises an L-shaped arm, and wherein an end of the L-shaped arm is oriented substantially vertical;
a pivotal joint connected to the end of the L-shaped arm;
a keyway system interfaced between the first and second members, the keyway system comprising:
an elongated slot extending along at least a portion of the second member; and
a protrusion positioned through a sidewall of the first member and into the elongated slot, wherein the protrusion prohibits rotational movement of the second member within the first member; and
a deployable canopy comprising a shaft and a shade, the shaft mounted to the second member at the substantially vertical end of the L-shaped arm with the pivotal joint, wherein the pivotal joint allows rotation of the canopy between deployed and non-deployed positions.

* * * * *